(12) United States Patent
Dieter-Naegerl et al.

(10) Patent No.: US 7,649,038 B2
(45) Date of Patent: Jan. 19, 2010

(54) POLYPHOSPHATE DERIVATIVE OF A 1,3,5-TRIAZINE COMPOUND, METHOD FOR PRODUCING THE SAME AND ITS USE

(75) Inventors: Hans Dieter-Naegerl, Dudenhofen (DE); Thomas Futterer, Ingelheim (DE); Vincens Mans Fibla, Badalona (ES); David Garcia Martinez, Saragossa (ES); Eduardo Tortosa Gimeno, Barcelona (ES)

(73) Assignee: Chemische Fabrik Budenheim KG, Budenheim (DE)

( * ) Notice: Subject to any disclaimer, the term of this patent is extended or adjusted under 35 U.S.C. 154(b) by 0 days.

(21) Appl. No.: 11/661,874

(22) PCT Filed: Sep. 2, 2005

(86) PCT No.: PCT/EP2005/054340

§ 371 (c)(1),
(2), (4) Date: Feb. 25, 2008

(87) PCT Pub. No.: WO2006/027340

PCT Pub. Date: Mar. 16, 2006

(65) Prior Publication Data

US 2008/0269384 A1 Oct. 30, 2008

(30) Foreign Application Priority Data

Sep. 4, 2004 (DE) .................. 10 2004 042 833

(51) Int. Cl.
*C08K 5/53* (2006.01)
*C08K 5/5313* (2006.01)

(52) U.S. Cl. ...................... 524/126; 524/133
(58) Field of Classification Search .................. 524/126
See application file for complete search history.

(56) References Cited

U.S. PATENT DOCUMENTS

| | | | | |
|---|---|---|---|---|
| 3,926,990 | A | 12/1975 | Fukuba et al. | 260/249.6 |
| 4,396,586 | A | 8/1983 | Maurer et al. | 423/305 |
| 6,136,973 | A * | 10/2000 | Suzuki et al. | 544/195 |
| 6,444,315 | B1 * | 9/2002 | Barfurth et al. | 428/403 |
| 2005/0173684 | A1 * | 8/2005 | Schlosser et al. | 252/609 |

FOREIGN PATENT DOCUMENTS

| | | |
|---|---|---|
| DE | 19830128 | 2/2000 |
| DE | 10126718 | 12/2002 |
| EP | 0974588 | 5/2003 |
| EP | 1386942 | 2/2004 |
| JP | 2004010649 | 1/2004 |
| WO | WO9744377 | 11/1997 |
| WO | WO0002869 | 1/2000 |
| WO | WO03031417 | 4/2003 |

* cited by examiner

*Primary Examiner*—Ling-Siu Choi
*Assistant Examiner*—Hui Chin
(74) *Attorney, Agent, or Firm*—Michael L. Dunn

(57) ABSTRACT

Phosphate derivatives of a 1,3,5-triazine compound, preferably melamine polyphosphate, which are heat-resistant at the processing temperature, are selected which have an average condensation coefficient n (number average)>20, a pH-value of a 10% slurry of the polyphosphate derivative in water at 25° C. of 5 or higher, a molar ratio of 1,3,5-triazine compound to phosphorus (M/P)<1.1 and a decomposition temperature>320° C. They can be produced by heat treatment of an orthophosphate or condensed phosphate with an average condensation coefficient n (number average) below 20 in an ammonia atmosphere at a temperature in the range of 300 to 400° C. until the average condensation coefficient is above 20 and the molar ratio of 1,3,5-triazine compound to phosphorus (M/P) is below 1.1. The polyphosphates of the invention can be represented in simplified form by the following general formula:

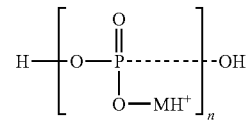

wherein M denotes a 1,3,5-triazine compound and n denotes the average condensation coefficient. For high and medium condensation coefficients n the sum formula can be reduced to $(MHPO_3)_n$. Therein M once again denotes the 1,3,5-triazine compound and n denotes the average condensation coefficient. These polyphosphate derivatives can be used as flame-retardant agents in any plastic materials, preferably thermoplastic materials and thermosetting materials, in particular also in glass fibre-reinforced polyamides and polyesters which are processed at high temperatures.

28 Claims, No Drawings

POLYPHOSPHATE DERIVATIVE OF A 1,3,5-TRIAZINE COMPOUND, METHOD FOR PRODUCING THE SAME AND ITS USE

BACKGROUND OF THE INVENTION

WO 00/02869, incorporated herein by reference as background art, discloses polyphosphate salts of 1,3,5-triazine compounds which have an average condensation coefficient (number average) of greater than 20 and a molar ratio of triazine compound such as melamine to phosphorus (M/P)> 1.1. The WO-specification also describes a two-stage process for the production of those salts by conversion of a 1,3,5-triazine compound with orthophosphoric acid into the corresponding orthophosphate salt as well as thermal treatment for conversion of the orthophosphate salt into a polyphosphate of the 1,3,5-triazine compound. In addition to the orthophosphates it is also possible to use pyrophosphates. The polyphosphate salts described in that publication are desirably to be used as flame-retardant agents.

WO-specification WO 97/44377 describes a melamine polymetaphosphate of a solubility of 0.01 to 0.10 g/100 ml in water at 25° C., a pH-value of 2.5 to 4.5, in the form of a 10% aqueous slurry at 25° C. and a melamine content of 1.0 to 1.1 mole per mole of phosphorus. That melamine polymetaphosphate is also obtained in a two-stage process in which in a first stage melamine, urea and an aqueous orthophosphoric acid solution are mixed together in such a ratio that the molar ratio of melamine to orthophosphoric acid is 1.0 to 1.5 and the molar ratio of urea to orthophosphoric acid is 0.1 to 1.5. The reaction is effected at a temperature of 0 to 140° C. with the removal of water, a powder double salt of orthophosphoric acid, melamine and urea being obtained. In a second stage that is calcined at a temperature of 240 to 340° C. and in that case affords melamine polymetaphosphates. That publication also refers to flame-retardant agents as the field of use for the melamine polymetaphosphates.

WO 00/02869 refers to the disadvantage of the melamine polymetaphosphates in accordance with WO 97/44377 that the melamine polymetaphosphates produced in accordance with the process described therein are unsuitable for the use as flame-retardant agents in polymers, in particular in polyamides and polyesters which are typically processed at elevated temperatures. According to the information set out in WO 00/02869 those melamine polymetaphosphates have inadequate heat resistance, impact strength, tensile strength and breaking strength. There was therefore no reason for the man skilled in the art to find suggestion in WO 97/44377 for example for improving the polyphosphate salts in accordance with WO 00/02869.

European laid-open application No 1 386 942 discloses flame-retardant agents which include a phosphinate or diphosphinate together with a 1,3,5-triazine compound, which are intended to improve the effect over the individual substances.

When using polyphosphate salts in accordance with WO 00/02869 as flame-retardant agents in plastic materials, in particular in glass fibre-reinforced polyamides, polyesters, such as polyethylene terephthalate and polybutylene terephthalate which are usually processed at relatively high temperatures (more specifically above 320° C.), premature partial decomposition was also noted, which on the one hand lead to an attack by the decomposition products on the moulding tools used and which later when used for example as electrical insulating lacquers on copper wires lead to an attack on the latter.

BRIEF DESCRIPTION OF THE INVENTION

The object of the invention is the improvement of polyphosphate salts of 1,3,5-triazine compounds, which are known from WO 00/02869, so that they are heat-resistant even at processing temperatures above 320° C. and for that purpose have a low level of water solubility and a low level of conductivity. Surprisingly that object was attained by the present invention, in respect of which information on page 2 and page 11 of WO 00/02869 is in part in conflict. The polyphosphate derivatives according to the invention of a 1,3,5-triazine compound, preferably melamine polyphosphate, with an average condensation coefficient n (number average)>20 and a pH-value of a 10% aqueous slurry of the polyphosphate derivative at 25° C. of 5 or higher are characterised in that they have a molar ratio of 1,3,5-triazine compound to phosphorus, M/P<1.1 and a decomposition temperature>320° C.

They can be produced by heat treatment of an orthophosphate or condensed phosphate with an average condensation coefficient n (number average) below 20 in an ammonia atmosphere at a temperature in the range of 300 to 400° C. until the average condensation coefficient is above 20 and the molar ratio of 1,3,5-triazine compound to phosphorus (M/P) is below 1.1

Because of the surprising heat resistance of the polyphosphate derivatives according to the invention, there are no longer any limitations in terms of the use of melamine polyphosphates and corresponding triazine derivatives as flame-retardant agents in plastic materials, in particular thermoplastic materials.

The polyphosphates of the invention can be represented in simplified form by the following general formula:

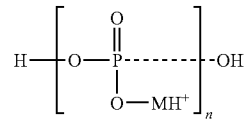

wherein M denotes a 1,3,5-triazine compound and n denotes the average condensation coefficient. For high and medium condensation coefficients n the sum formula can be reduced to $(MHPO_3)_n$. Therein M once again denotes the 1,3,5-triazine compound and n denotes the average condensation coefficient.

These polyphosphate derivatives can be used as flame-retardant agents in any plastic materials, preferably thermoplastic materials and thermosetting materials, in particular also in glass fibre-reinforced polyamides and polyesters which are processed at high temperatures.

DETAILED DESCRIPTION OF THE INVENTION

In consideration of the information in WO 00/02869 on pages 1 and 2 as well as page 11, lines 15-20, it was not to be expected that melamine phosphate derivatives would be suitable for flame retardants but rather, in view of the prior art the man skilled in the art would have believed that, with a M/P<1.1 no pH-value of the melamine polyphosphate above 5 could be obtained and that the phosphate derivatives with such a low M/P would not be suitable as a flame-retardant agent for plastic materials such as glass fibre-reinforced polyamides and polyesters, because of the excessively low level of heat resistance.

Because of the surprising heat resistance of the polyphosphate derivatives according to the invention, there are no longer any limitations in terms of the use of melamine polyphosphates and corresponding triazine derivatives as flame-retardant agents in plastic materials, in particular thermoplastic materials.

The series of plastic materials into which the polyphosphate derivatives according to the invention can be incorporated are to be found on pages 6 and 7 of WO 00/02869, incorporated herein by reference as background art. Such plastics and resins include polyamides, e.g. glass fibre-reinforced polyamides, and polyesters, such as polyethylene terephthalate and polybutylene terephthalate.

A more complete list of such plastics and polymers is as follows:

1. Polymers of mono- and diolefins, for example: polypropylene (PP), polyisobutylene, polybutylene-1, polymethylpentene-1, polyisoprene or polybutadiene; polyethylenes (optionally crosslinked) including, for example, high-density polyethylene (HDPE), low-density polyethylene (LDPE), linear low-density polyethylene (LLDPE), or mixtures of these polymers.

2. Copolymers of mono- and diolefins, optionally including other vinyl monomers such as, for example, ethylene-propylene copolymers, linear low-density polyethylene, and mixtures thereof with low-density polyethylene, as well as terpolymers of ethylene with propylene and a diene such as hexadiene, dicyclopentadiene or ethylidene norbornene; furthermore, mixtures of such copolymers with the polymers listed under 1 such as, for example, polypropylene/ethylene-propylene copolymers.

3. Polystyrene, poly-(p-methyl-styrene), poly-(a-methylstyrene) and copolymers of styrene or a-methylstyrene with dienes or acryl derivatives, such as, for example, styrene-butadiene, styrene-acrylonitrile, styrene-alkylmethacrylate, styrene-butadiene-alkylacrylate, styrene-maleic anhydride and styrene-acrylonitrile-methylacrylate.

4. Polyphenylene oxide and polyphenylene sulphide and their mixtures with styrene polymers or with polyamides.

5. Polyurethanes derived from polyethers, polyesters and polybutadiene with terminal hydroxy groups on the one hand and aliphatic or aromatic polyisocyanates on the other, as well as their precursors.

6. Polyamides and copolyamides derived from diamines and dicarboxylic acids and/or fromaminocarboxylic acids or the corresponding lactams, such as polyamide 4, polyamide 6, polyamide 6/6, 6/10, 6/9, 6/12, 4/6, 66/6, 6/66, polyamide 11, polyamide 12, aromatic polyamides based on an aromatic diamine and adipic acid; polyamides prepared from hexamethylene diamine and iso- and/or terephthalic acid and optionally an elastomer as modifier, for example poly-2,4,4-trimethyl hexamethylene terephthalamide, poly-m-phenylene-isophthalamide.

7. Polyesters derived from dicarboxylic acids and dialcohols and/or from hydroxycarboxylic acids or the corresponding lactones such as polyethyleneterephthalate, polybutylene terephthalate, poly-1,4-dimethylol cyclohexane terephthalate and polyhydroxybenzoates.

8. Thermosetting resins including, for example, unsaturated polyesters, saturated polyesters, alkyd resins, polyacrylate or polyether or compositions containing one or more of these polymers and a crosslinking agents.

The polyphosphates of the invention can be represented in simplified form by the following general formula:

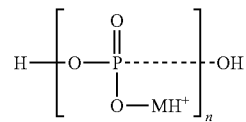

wherein M denotes a 1,3,5-triazine compound and n denotes the average condensation coefficient. For high and medium condensation coefficients n the sum formula can be reduced to $(MHPO_3)_n$. Therein M once again denotes the 1,3,5-triazine compound and n denotes the average condensation coefficient.

1,3,5-Triazine compounds which can be considered include, for example, 2,4,6-triamine-1,3,5-triazine (melamine) and its derivatives, condensation products such as melam, melem, melon, ammeline and ammelide but also 2-ureidomelamine, acetoguanamine, benzoguanamine and diaminophenyltriazine. It will be appreciated that it is also possible to use mixtures of those 1,3,5-triazine compounds. Melamine, its derivatives and condensation products are preferred in the present invention, in particular melamine.

The average condensation coefficient n of the phosphates can be ascertained in accordance with known methods such as for example by means of NMR, J. Am. Chem. Soc. 78, 5715 (1956). The average condensation coefficient n is preferably at least 30, still more preferably in the range of 40 to 150. That average condensation coefficient can also be referred to as the average chain length of the phosphate derivative.

The polyphosphate derivatives according to the invention have an enhanced heat resistance at 320° to 370° C. That is determined by the temperature at which the weight loss is 2%. The low M/P-ratio results in a higher P content and thus a process effect which is 15% better and an extremely low level of water solubility, which is of very great significance in terms of plastic products, in particular in the outdoor region. The water solubility of the polyphosphate derivatives according to the invention is preferably below 0.1 g/100 ml and still more preferably below 0.01 g/100 ml. With those orders of magnitude it is possible to refer to a product which is virtually insoluble in water.

As mentioned the molar ratio M/P is preferably below 1.0 and still more preferably between 0.8 and 1.0.

The pH-value is determined in a 10% aqueous slurry of the polyphosphate derivative according to the invention, by a procedure whereby 25 g of the polyphosphate derivative and 225 g of pure water are stirred at 25° C. in a vessel and the pH-value of the resulting aqueous suspension is determined with conventional means. Preferred pH-values are approximately in the range of 5.1 to 6.9.

Preferably the polyphosphate derivatives according to the invention have a decomposition temperature above 360, particularly above 380 and in particular above 400° C.

A process according to the invention for the production of the polyphosphate derivatives set forth in claims 1 to 6 provides that an orthophosphate and/or at least one condensed phosphate of a 1,3,5-triazine compound, preferably melamine, with an average condensation coefficient n of below 20, is heat-treated in an ammonia atmosphere at a temperature in the range of 300 to 400° C., preferably in the range of 340 to 380° C., particularly preferably in the range of 370 to 380° C., and in that case a condensation product with an average condensation coefficient n (number average)>20 is obtained.

Usually the starting material involved is the melamine orthophosphate but that can be supplemented or replaced by condensed phosphates such as for example pyrophosphates and less condensed polyphosphates. The heat treatment must be effected for different periods of time at different temperatures depending on the respective starting phosphate used so that at any event the average condensation coefficient is above 20. The concentration of the ammonia in the gas atmosphere of the heat-treatment zone is desirably in the range of 0.1 to 100% by mass, preferably in the range of 1 to 30%, particularly in the range of 2 to 10%, in particular 3 to 5%. It is particularly desirable for the starting material used to be a 1,3,5-triazine compound, preferably a melamine compound, with a particle size which is as fine as possible, desirably an average particle size≦15 μm, preferably ≦10 μm. With a coarser particle size grinding of the starting products is desirably effected prior to the heat treatment in order to produce the specified average particle sizes≦15 μm, preferably ≦10 μm.

The flame-retardant properties of the polyphosphate derivatives according to the invention of a 1,3,5-triazine compound can be further increased if the polyphosphate derivatives are combined with at least one phosphinate and/or diphosphinate.

Preferably the phosphinates or diphosphinates are of the following formulae I and II respectively:

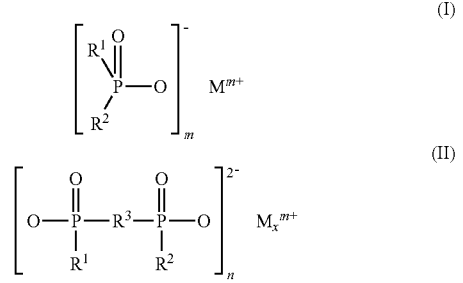

wherein
$R^1$, $R^2$ are the same or different and $C_1$-$C_6$-alkyl, straight or branched, $C_1$-$C_7$-hydroxyalkyl, straight or branched, or aryl,
$R^3$ is $C_1$-$C_{10}$-alkyls, straight or branched, $C_6$-$C_{10}$-aryls, alkylaryls or arylalkyls,
M is Mg, Ca, Al, Sb, Sn, Ge, Ti, Zn, Fe, Zr, Ce, Bi, Sr, Mn, Li, Na, K and/or a protonised nitrogen base, preferably Ca, Mg, Al and Zn,
m is 1 to 4,
n is 1 to 4, and
x is 1-4.

Particularly preferably M is the same as Al. Desirably the flame-retardant mixtures contain so much of the polyphosphate derivative (A) according to the invention and the diphosphinate (B) that A:B=3:7 to 7:3, preferably 3:4 to 4:3.

The flame-retardant properties of the polyphosphate derivatives according to the invention of a 1,3,5-triazine compound can be quite particularly preferably also increased by the polyphosphate derivatives being mixed with aluminium phosphinates of the general formula (I):

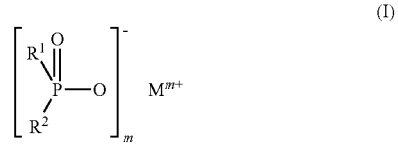

wherein
$R^1$ is —$CH_3$, —$CH_2OH$, —$C_2H_5$, —$CH(OH)CH_3$ or —$C(OH)(CH_3)_2$,
$R^2$ is —$CH_2OH$, —$C_2H_4OH$, —$C_3H_6OH$ or —$CH(OH)CH_3$,
M is Al, and
m 1 to 4

The aluminium phosphinate mixtures can be obtained by the free phosphinic acids being obtained in aqueous solution in known manner from alkali phosphinate mixtures and by their being reacted by subsequent boiling with aluminium hydroxide or aluminium oxyhydroxide slurries in water. It is found however that this neutralisation reaction takes up reaction times which are many times longer. It is therefore more appropriate for the alkali phosphinates obtained from the phosphorus reaction to be caused to react with the required amount of water-soluble aluminium salts such as for example chloride, hydroxychloride, sulphate, nitrate or formiate in aqueous solution, in which respect it may be necessary to completely dissolve the mixture by a small mineral acid addition and then to precipitate the aluminium phosphinate mixtures by raising the pH-value to 4 to 7. Subsequent heating of the aqueous suspension to temperatures between 105 and 150° C. in pressure vessels facilitates later separation of the difficulty soluble precipitate. The aluminium phosphinate precipitate is then filtered, washed and dried.

A further advantageous embodiment of the invention is characterised in that all or a part of the flame-retardant agents, that is to say the polyphosphinate derivative or derivatives and/or the phosphinate or phosphinates and/or diphosphinate or diphosphinates and/or the further included per se known flame-retardant agents, are coated with a silicon-bearing coating agent and/or modified in some other fashion. Such a modification of other compounds is known for example from DE 198 30 128 A1, incorporated herein by reference as background art. With the modification procedure an organofunctional silane or a mixture of organofunctional silanes or an oligomeric organosiloxane or a mixture of oligomeric organosiloxanes or a solvent-bearing preparation based on monomeric organosilanes and/or oligomeric organosiloxanes or a preparation based on water-soluble organopolysiloxanes are applied to a flame-retardant agent in powder form and the flame-retardant agent is kept in motion during the coating operation.

Preferably 0.05 to 10% by weight of silicon-bearing coating agent with respect to the amount of flame-retardant agent is used. Desirably the coating agent is applied to the flame-retardant agent in the course of 10 seconds to 2 hours at a temperature of 0 to 200° C. It is further advantageous if the flame-retardant agent which is coated with coating agent is subjected to a post-treatment under the effect of heat at a temperature of up to 200° C. and/or under reduced pressure. The organofunctional silane used is advantageously an aminoalkyl- or epoxyalkyl- or acryloxyalkyl- or methacryloxyalkyl- or mercaptoalkyl- or alkenyl- or alkyl-functional alkoxysilane.

A particular advantage of modifying the flame-retardant agent with silicon-bearing coating agent is that the flame-retardant agent is more resistant to environmental influences such as moisture. The modification provides that washing-out of the flame-retardant agent in the course of time is prevented or reduced.

The invention is further described by reference to the following Examples.

Example 1 and Comparative Example 1 a. 876.96 kg of melamine was mixed in a blade mixer. 784 kg of 75% phosphoric acid was brought into contact with the melamine by spraying, in which case the reaction took place. The melamine orthophosphate formed was finely ground in an ACM-mill.

b. The melamine orthophosphate was heat-treated in an oven. The oven temperature was set to 380° C. before the melamine orthophosphate was introduced into the oven. The temperature and the ammonia concentration in the oven atmosphere were respectively set and kept approximately constant throughout the entire experiment. An ammonia atmosphere was created in the oven, with the ammonia concentration in the ammonia atmosphere being variable.

In Example 1 in accordance with the invention a relatively high ammonia concentration, namely corresponding to −3 mm water column, was set. One result was that the pH-value was 5.524 and thus markedly above 5. At the same time the solubility at 0.032 g/100 ml was reduced to approximately a third in comparison with the subsequent Comparative Example. It was not possible to find any chemical attack on the moulding tools in the subsequent processing operation. The heat resistance of the product of Example 1 was about 373° C.-TGA (2% weight loss), that is to say a weight loss of 2% was achieved at about 373° C.

In Comparative Example 1 a lower ammonia concentration than in Example 1 was set by altering the level of ammonia concentration in the oven atmosphere. That corresponded to −100 mm water column. The effect was that the pH-value now abruptly fell and was about 3.57 in the suspension. The heat resistance was about 353° C.-TGA (2% weight loss).

The conditions and results of this experiment are set out in Table 1.

TABLE 1

| Properties | Units | Example 1 | Comparative Example 1 |
|---|---|---|---|
| $P_2O_5$ | % | 34.46 | 33.120 |
| Nitrogen (total) | % | 41.31 | 40.120 |
| pH-value | | 5.524 | 3.568 |
| Solubility | g/100 ml | 0.032 | 0.095 |
| Acid index | mg KOH/g | 1.30 | 1.31 |
| Moisture | % | 0.068 | 0.075 |
| TGA 2% weight loss | ° C. | 372.91 | 353.030 |
| Decomposition peak | ° C. | 406.11 | 397.400 |
| M/P | | 1.02 | 1.030 |

Example 2 and Comparative Example 2

Melamine polyphosphate according to the invention (Example 2) and outside claim 1 of the invention (Comparative Example 2) were processed as in Example 1. The corresponding parameters as in Example 1 were ascertained and give the following result.

The conditions and results of this experiment are set forth in Table 2.

TABLE 2

| Properties | Units | Example 2 | Comparative Example 2 |
|---|---|---|---|
| $P_2O_5$ | % | 35.820 | 30.680 |
| Nitrogen (total) | % | 41.190 | 44.690 |
| pH-value | | 5.470 | 3.580 |
| Solubility | g/100 ml | 0.002 | 0.017 |
| Acid index | mg KOH/g | 0.435 | 3.271 |
| Moisture | % | | 0.313 |
| TGA 2% weight loss | ° C. | 373.100 | 374.770 |
| Decomposition peak | ° C. | 407.430 | 406.260 |
| M/P | ° C. | 0.980 | 1.240 |

In this case the heat resistance was practically the same in both tests, but the pH-value in Example 2 according to the invention is considerably higher than in the case of Comparative Example 2.

What is claimed is:

1. A polyphosphate derivative of a 1,3,5-triazine compound having:
   a) an average condensation coefficient n (number average)>20,
   b) with a pH-value of a 10% slurry of the polyphosphate derivative in water at 25° C. of 5 or higher,
   c) a molar ratio of 1,3,5-triazine compound to phosphorus (M/P)<1.1, and
   d) a decomposition temperature>320° C.

2. The derivative of claim 1 where the derivative is a melamine polyphosphate.

3. A polyphosphate derivative according to claim 1, wherein e) it has a water solubility<0.1 g/100 ml.

4. The derivative of claim 3 wherein it has a water solubility of <0.01 g/100 ml.

5. A polyphosphate derivative according to claim 1 wherein it has a molar ratio of 1,3,5-triazine compound to phosphorus of <1.0.

6. A polyphosphate derivative according to claim 1 wherein it has a molar ratio of 1,3,5-triazine compound to phosphorus of between 0.8 and 1.0.

7. A polyphosphate derivative according to claim 1 wherein a 10% slurry of the polyphosphate derivative in water at 25° C. (b) has a pH-value in the range of 5.1 to 6.9.

8. A polyphosphate derivative according to claim 1 wherein its average condensation coefficient (number average) is greater than 30.

9. A polyphosphate derivative according to claim 1 wherein its average condensation coefficient (number average) is from 40 to 150.

10. A polyphosphate derivative according to claim 1 wherein its decomposition temperature is higher than 360° C.

11. A polyphosphate derivative according to claim 1 wherein its decomposition temperature is higher than 380° C.

12. A polyphosphate derivative according to claim 1 wherein its decomposition temperature is higher than 400° C.

13. A process for the production of a polyphosphate derivative of a 1,3,5-triazine compound according to claim 1 wherein an orthophosphate or a condensed phosphate of a 1,3,5-triazine compound with an average condensation coefficient n (number average) below 20 is heat-treated in an ammonia atmosphere at a temperature in the range of 300 to 400° C. until the average condensation coefficient is above 20 and the molar ratio of 1,3,5-triazine compound to phosphorus (M/P) is below 1.1.

14. A process according to claim 13 wherein the heat treatment is effected in a temperature range of 340 to 380.

15. A process according to claim 13 wherein the heat treatment is effected in a temperature range of 370 to 380° C.

16. A process according to claim 13 wherein prior to the heat treatment the polyphosphate derivative is ground to an average particle size $\leq 15$ μm, preferably $\leq 10$ μm.

17. A process according to claim 13 wherein the heat treatment is effected in an ammonia atmosphere which contains ammonia in a concentration of 0.1 to 100% by mass.

18. A process according to claim 13 wherein the heat treatment is effected in an ammonia atmosphere which contains ammonia in a concentration of 1 to 30% by mass.

19. A process according to claim 13 wherein the heat treatment is effected in an ammonia atmosphere which contains ammonia in a concentration of 2 to 10% by mass.

20. A process according to claim 13 wherein the heat treatment is effected in an ammonia atmosphere which contains ammonia in a concentration of 3 to 5% by mass.

21. A method for retarding flame in a plastic material comprising protecting the plastic material with a polyphosphate derivative of a 1,3,5-triazine compound according to claim 1.

22. A flame-retardant agent for a plastic material comprising a polyphosphate derivative of a 1,3,5-triazine compound according to claim 1.

23. A flame-retardant agent according to claim 22 it also contains additional flame-retardant agents.

24. A flame-retardant agent according to claim 22 wherein it additionally contains at least one phosphinate and/or diphosphinate.

25. A flame-retardant agent according to claim 22 wherein it contains phosphinate of the general formula I and/or diphosphinate of the general formula II:

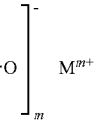
(I)

-continued

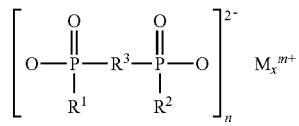
(II)

wherein
R$^1$, R$^2$ are the same or different and C$_1$-C$_6$-alkyl, straight or branched, C$_1$-C$_7$-hydroxyalkyl, straight or branched, or aryl,
R$^3$ is C$_1$-C$_{10}$-alkyls, straight or branched, C$_6$-C$_{10}$-aryls, alkylaryls or arylalkyls,
M is Mg, Ca, Al, Sb, Sn, Ge, Ti, Zn, Fe, Zr, Ce, Bi, Sr, Mn, Li, Na, K and/or a protonised nitrogen base, preferably Ca, Mg, Al and Zn,
m is 1 to 4,
n is 1 to 4, and
x is 1-4.

26. A flame-retardant agent according to claim 25 wherein M=Al.

27. A flame-retardant agent according to claim 25 wherein the phosphinate is a phosphinate of the general formula I:

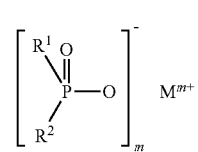
(I)

wherein
R$^1$ is —CH$_3$, —CH$_2$OH, —C$_2$H$_5$, —CH(OH)CH$_3$ or —C(OH)(CH$_3$)$_2$,
R$^2$ is —CH$_2$OH, —C$_2$H$_4$OH, —C$_3$H$_6$OH or —CH(OH)CH$_3$,
M is Al, and
m 1 to 4.

28. A flame-retardant agent according to claim 22 comprising a silicon-bearing coating agent.

* * * * *